E. P. BAIRD.
KEY CUTTING MACHINE.
APPLICATION FILED NOV. 5, 1915.

1,345,117.

Patented June 29, 1920.
8 SHEETS—SHEET 1.

E. P. BAIRD.
KEY CUTTING MACHINE.
APPLICATION FILED NOV. 5, 1915.

1,345,117.

Patented June 29, 1920.
8 SHEETS—SHEET 2.

Witnesses.
Robert H. Weir
Arthur W. Carlson

Inventor
Edward P. Baird
By Hill & Hill Attys

E. P. BAIRD.
KEY CUTTING MACHINE.
APPLICATION FILED NOV. 5, 1915.
1,345,117.
Patented June 29, 1920.
8 SHEETS—SHEET 3.
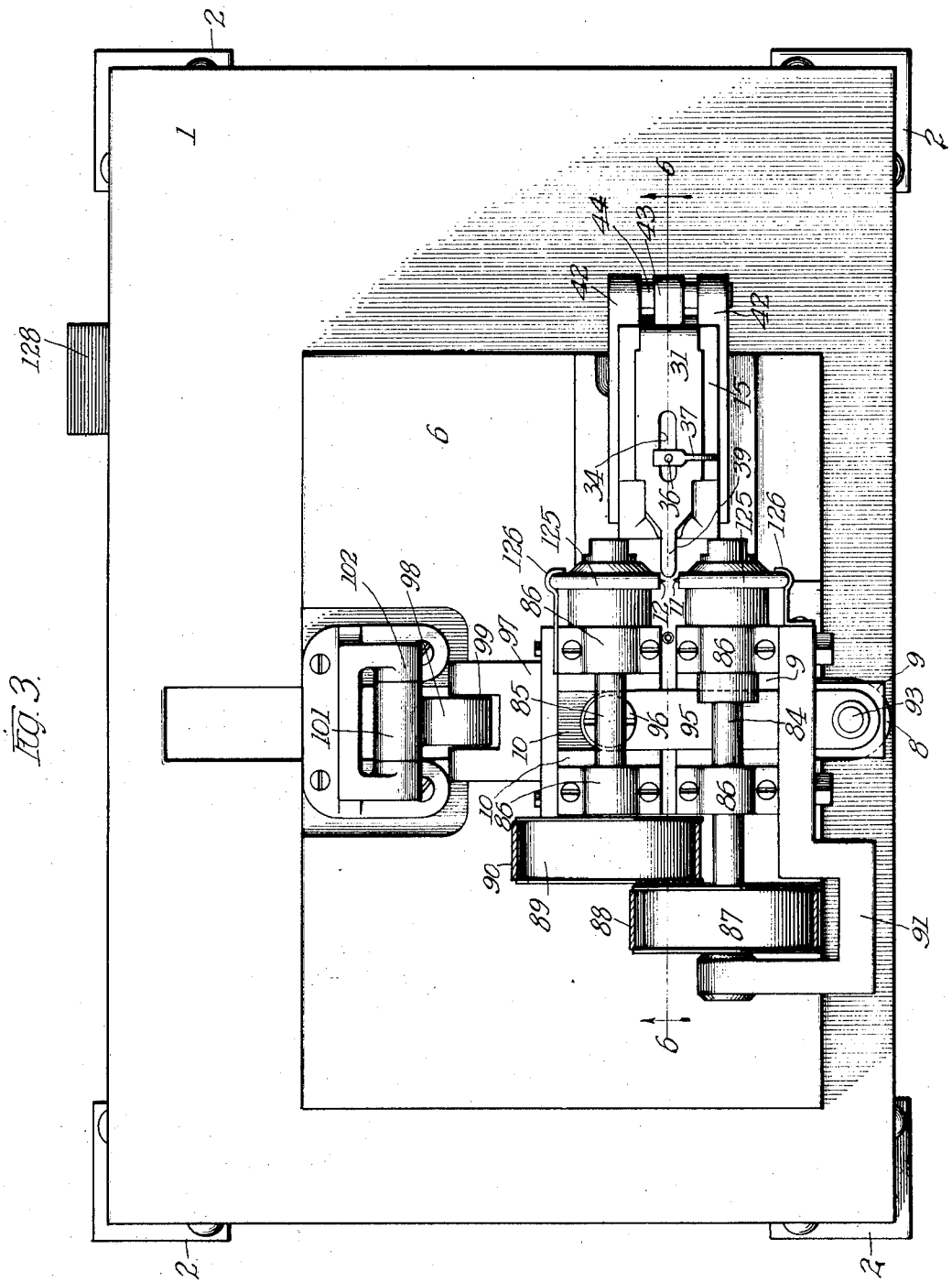
Witnesses:
Roberts F. Weir
Arthur W. Carlson
Inventor
Edward P. Baird
By Hill & Hill Attys

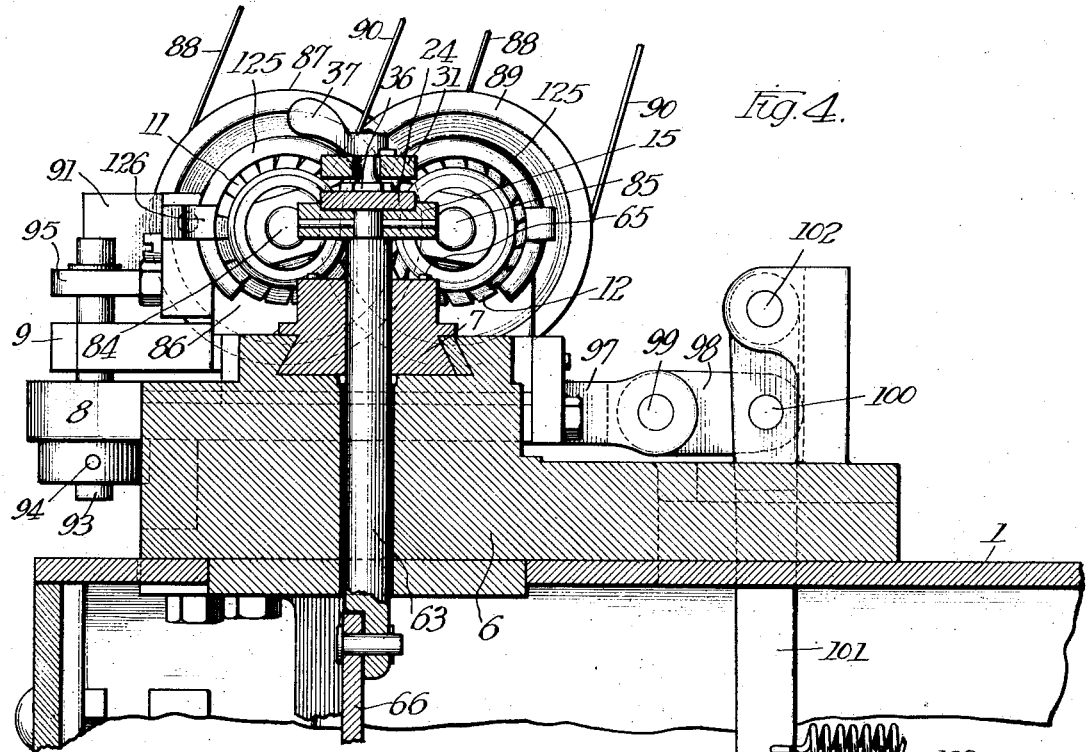
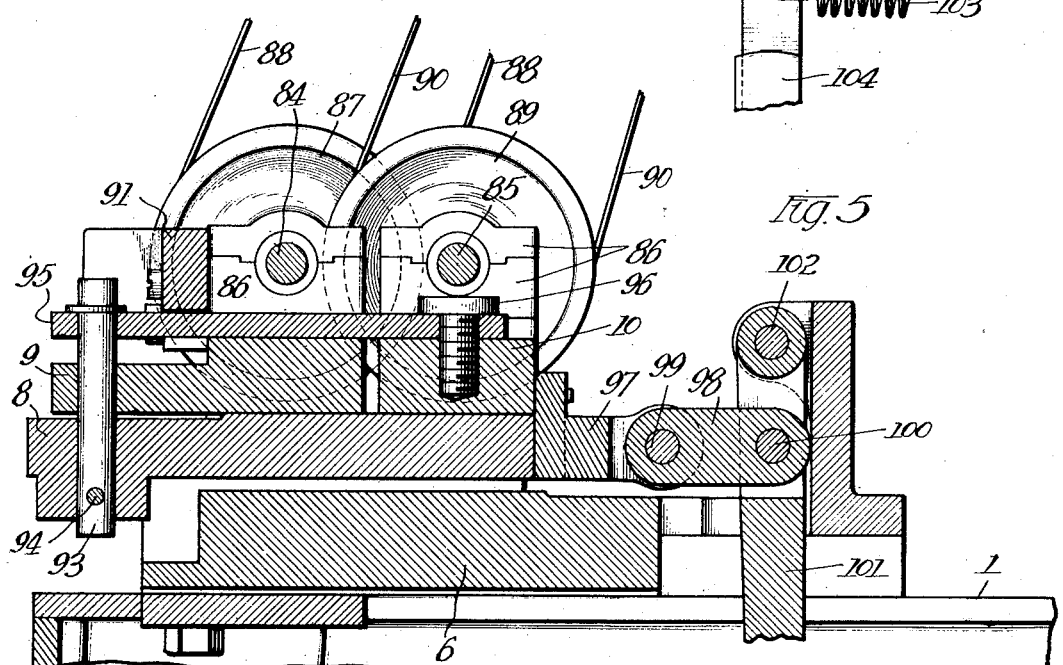

E. P. BAIRD.
KEY CUTTING MACHINE.
APPLICATION FILED NOV. 5, 1915.
1,345,117.
Patented June 29, 1920.
8 SHEETS—SHEET 5.
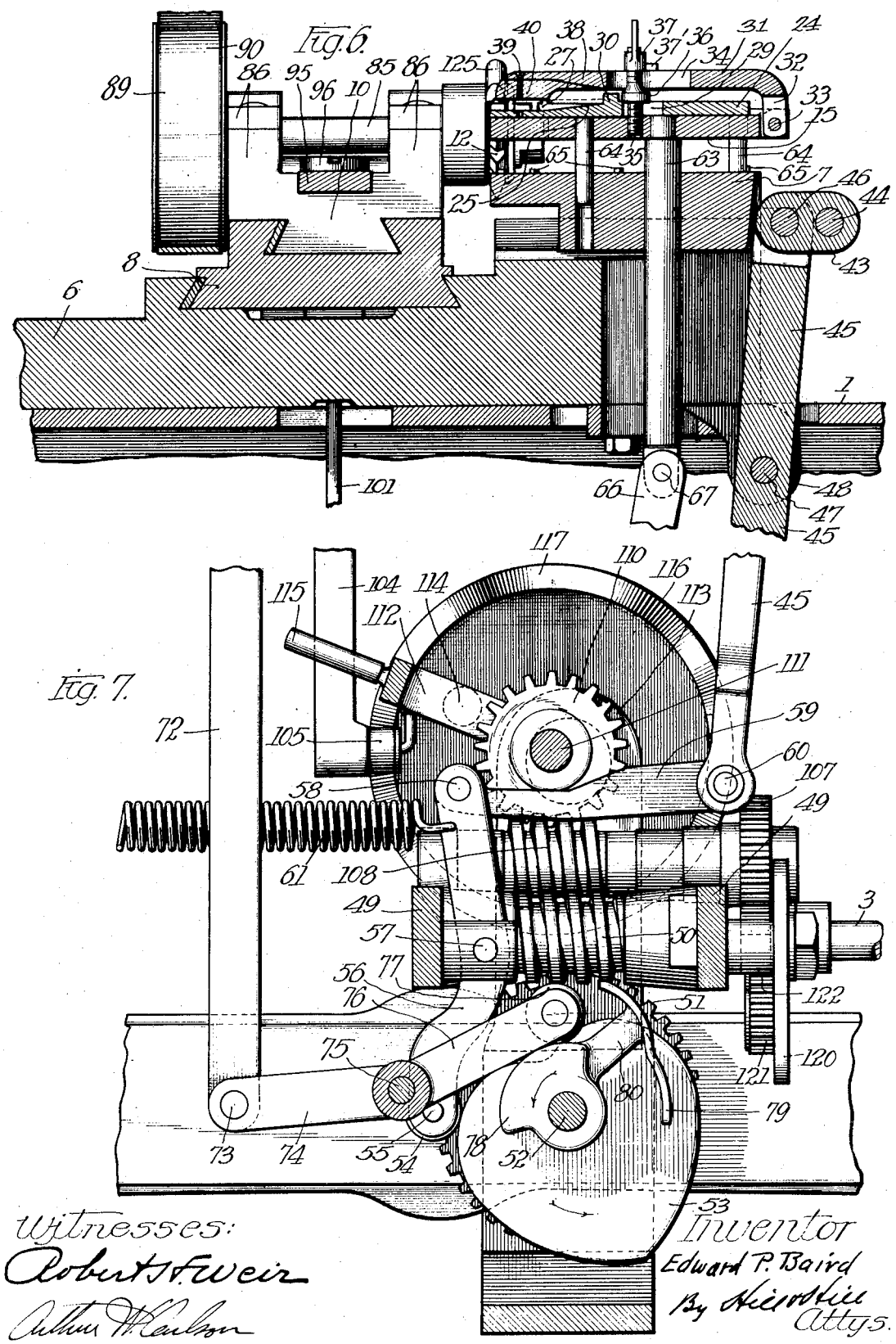
Witnesses:
Robert F. Weir
Arthur W. Carlson
Inventor
Edward P. Baird
By [signature]
Attys.

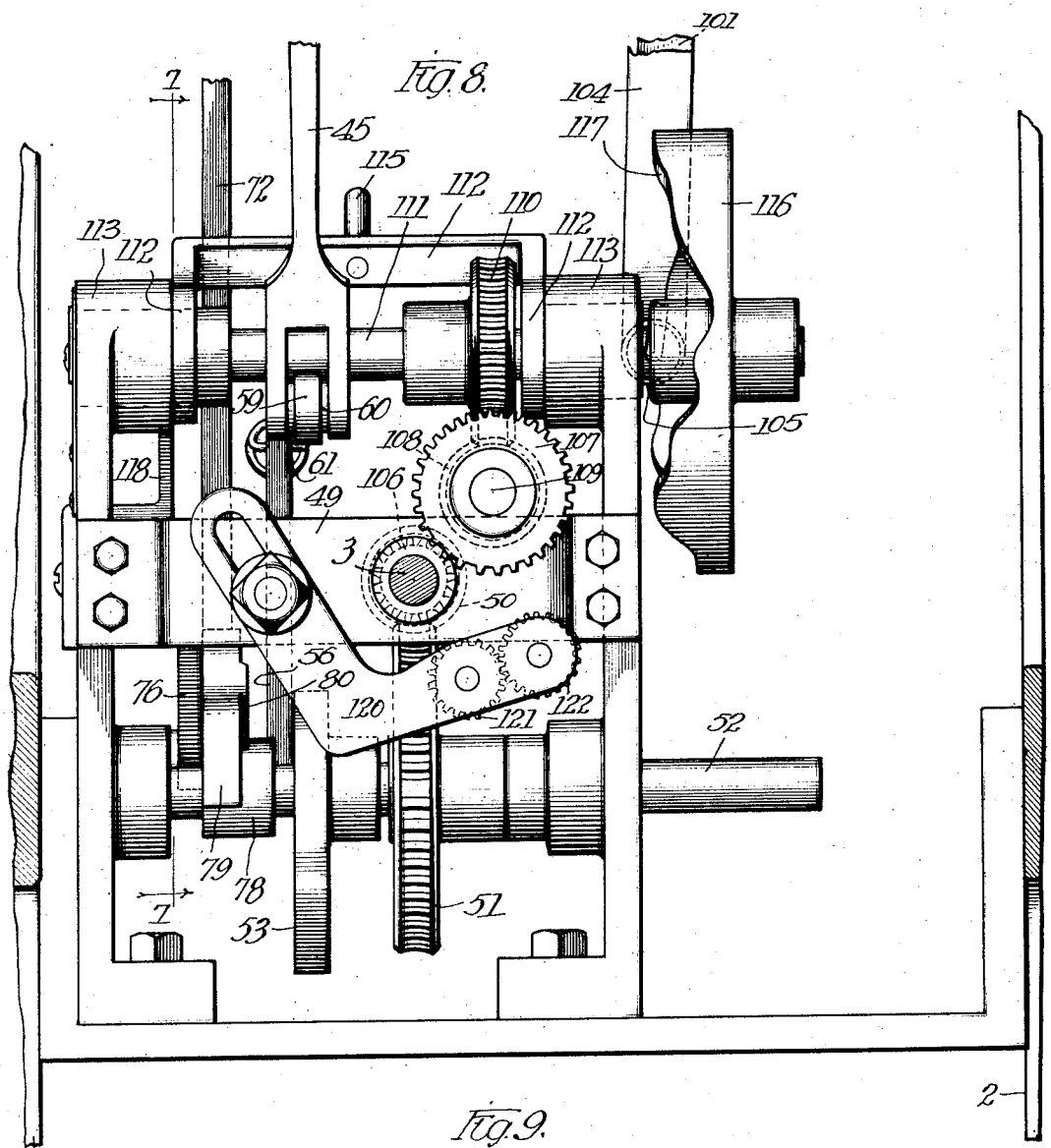
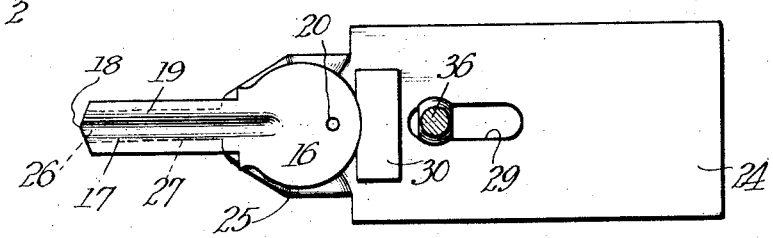

E. P. BAIRD.
KEY CUTTING MACHINE.
APPLICATION FILED NOV. 5, 1915.
1,345,117. Patented June 29, 1920.
8 SHEETS—SHEET 7.
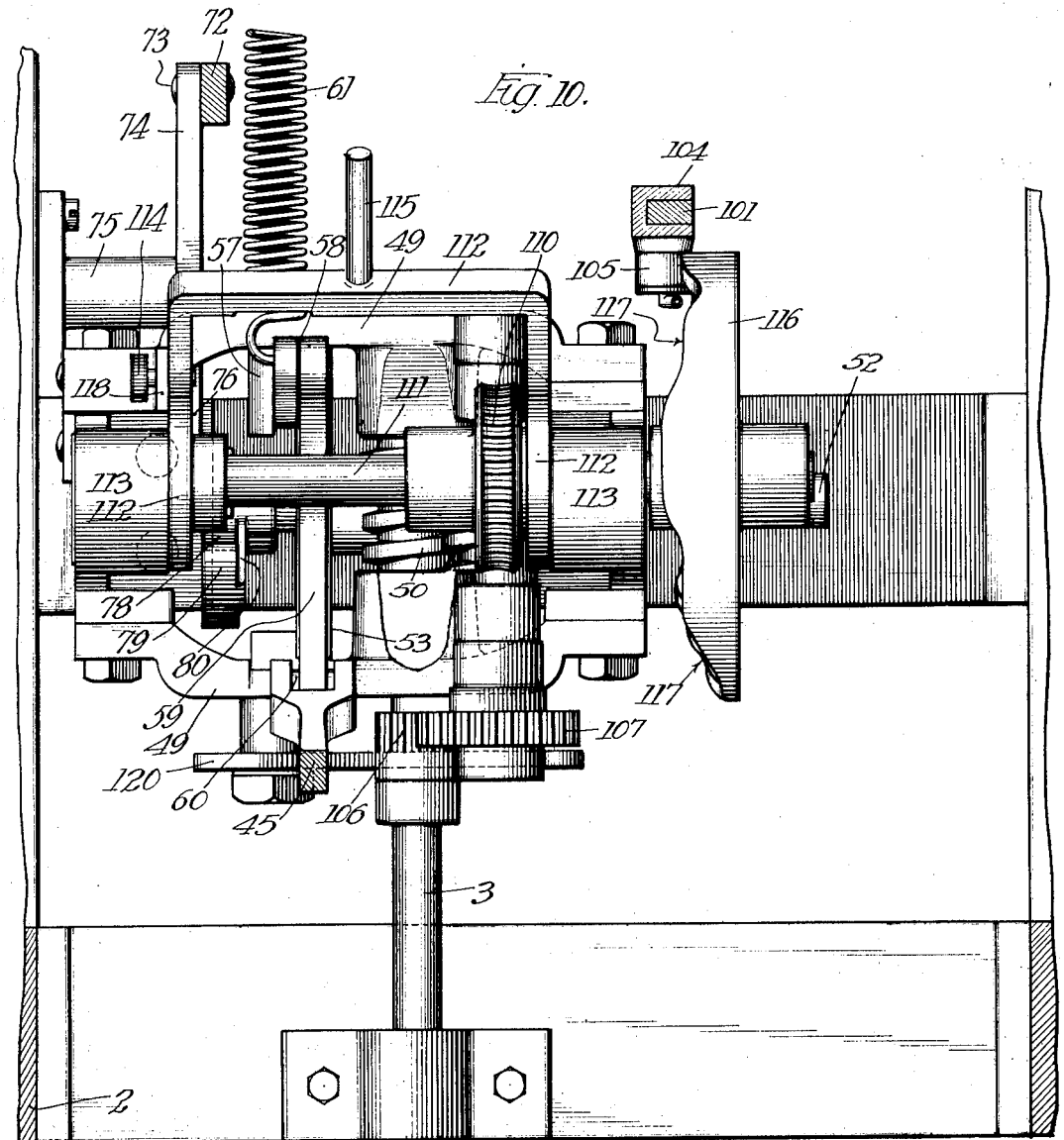
Fig. 10.
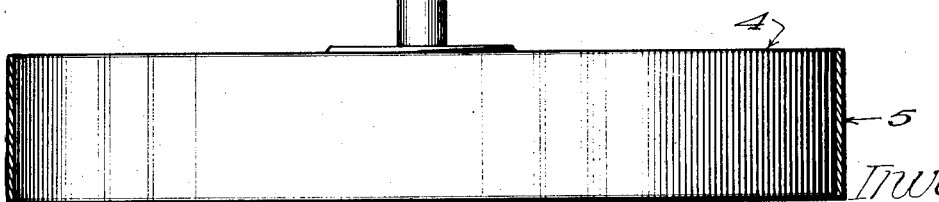
Witnesses:
Robert F. Weir
Arthur W. Carlson
Inventor
Edward P. Baird
By Hill & Hill
Attys.

E. P. BAIRD.
KEY CUTTING MACHINE.
APPLICATION FILED NOV. 5, 1915.
1,345,117.
Patented June 29, 1920.
8 SHEETS—SHEET 8.
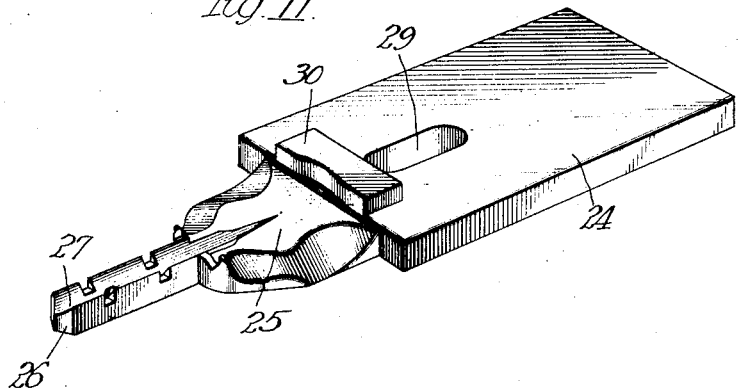
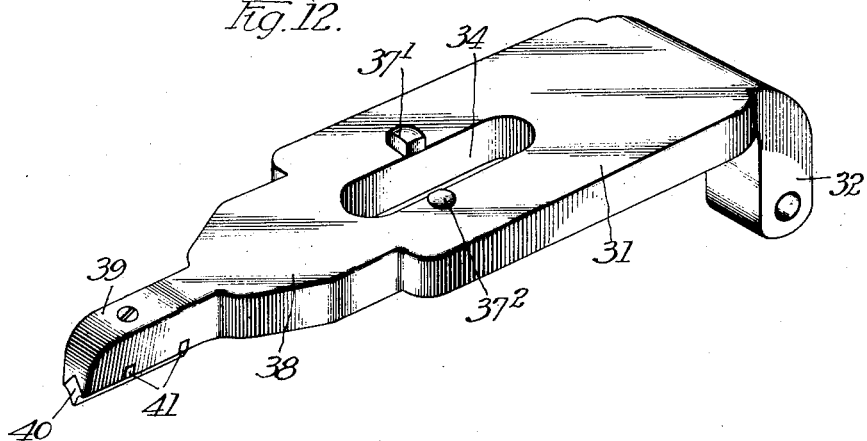
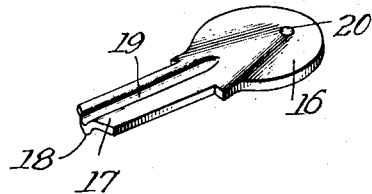
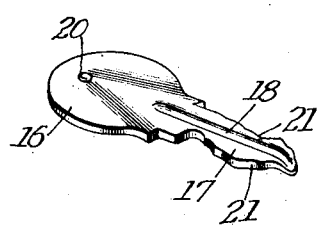
Witnesses:
Robert F. Weir
Arthur W. Carlson
Inventor
Edward P. Baird
By Hierstiee
Attys

UNITED STATES PATENT OFFICE.

EDWARD P. BAIRD, OF CHICAGO, ILLINOIS, ASSIGNOR TO THE KING LOCK COMPANY, OF CHICAGO, ILLINOIS, A CORPORATION OF ILLINOIS.

KEY-CUTTING MACHINE.

1,345,117.  Specification of Letters Patent.  Patented June 29, 1920.

Application filed November 5, 1915. Serial No. 59,818.

*To all whom it may concern:*

Be it known that I, EDWARD P. BAIRD, a citizen of the United States, residing at Chicago, in the county of Cook and State of Illinois, have invented certain new and useful Improvements in Key-Cutting Machines, of which the following is a description.

My invention belongs to that general class of devices known as key cutting machines, and relates particularly to a machine adapted to cut a series of notches or undulations on one or both sides or edges of the key. The machine is especially designed to cut in a pre-arranged manner a series of keys, all slightly varying, which series of keys may be cut in duplicate, triplicate, or in as many sets as may be desired, each set being identical. The machine is also designed to permit the production of duplicate keys at any time thereafter, a suitable record of the desired key being kept to identify the same, as for example a complete set of finished or pattern keys. The invention has among its objects the production of a key cutting machine of the kind described that is simple, convenient, efficient, rapid in operation, and satisfactory, and which does not require a skilled operator to manipulate.

The machine is particularly designed, and has among its further objects the production of a machine which will cut a plurality of keys of varying form, an operator being required only to insert and remove the keys from the machine. It is especially designed to cut keys for extremely sensitive locks, as for example, plate tumbler locks, in which ordinarily the lock provided with a plurality of these plate tumblers are substantially fitted to the keys, but, however, the machine is not limited to cutting keys in this particular type of lock, as it may be used wherever applicable. Other objects and advantages of the construction herein described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts, Figure 1 is a front elevation of the machine;

Fig. 3 is a top plan view of the machine;

Fig. 4 is a sectional view taken substantially on line 4, 4 of Fig. 1;

Fig. 5 is a sectional view taken substantially on line 5, 5 of Fig. 1;

Fig. 6 is a sectional view taken substantially on lines 6, 6 of Fig. 3;

Fig. 7 is a sectional view taken substantially on lines 7, 7 of Fig. 8;

Fig. 8 is a sectional view taken substantially on line 8, 8 of Fig. 1;

Fig. 9 is a plan view of a portion of the carrier with the key in place;

Fig. 10 is a sectional view taken substantially on line 10, 10 of Fig. 1;

Fig. 11 is a perspective view of one part of the key carrier;

Fig. 12 is a similar view of the coöperating part;

Fig. 13 is a perspective view of a sample key before cutting, and

Fig. 14 is a similar view of the reverse side of the key, showing the same after cutting.

Figure 1:
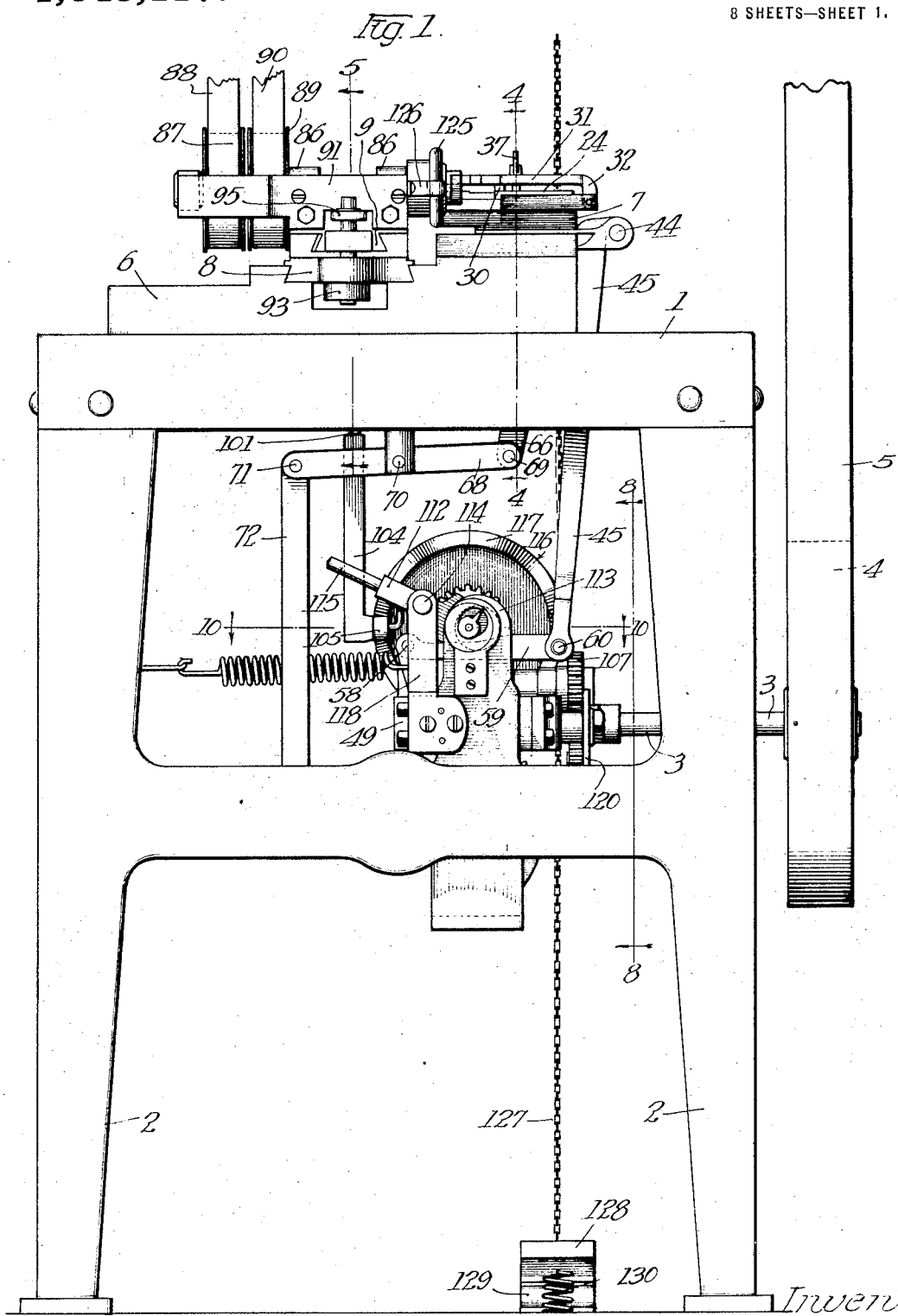

As was previously set forth, the machine is intended for cutting a series of different keys, and similarly duplicating the sets or portions thereof, as desired. The machine may perhaps be better understood by referring first to Figs. 13 and 14, in which a sample key is shown before and after cutting. The key shown in Fig. 14 is cut upon both sides, so that the edges are similar, but where desired the same may be cut only on one side, as will be more clearly understood from the description hereafter given. It is not considered necessary to illustrate any of the locks, tumblers, or the like, designed to coöperate with this type of key, as this forms no part of the present invention. As most clearly shown in Figs. 1 and 2, the machine consists preferably of a frame consisting of the top part 1, with suitable supporting legs 2, 3 being the driving shaft or source of power, which may be driven by the pulley 4 and belt 5, or equivalent means. Arranged on the table or frame part 1 is a bed 6, which carries what may be termed a key carrier 7, and a cutter carriage 8. The cutter carriage 8 shown carries two adjustable carriers or carriages 9 and 10, which will be more fully described hereafter. In the drawings is shown two rotary cutters 11 and 12.

The keys shown in Figs. 13 and 14 consist of the head 16, by means of which the key may be turned in the lock, which is provided with a shank or bar 17. I have shown a sheet metal stamped key, which is formed with an offset or bead 18 on one side forming a groove 19 on the other, 20 being a hole through the key for convenience in placing the same on a ring or for hanging the key up. Before cutting, the edges of the key are substantially straight, as shown in Fig. 13, while the cut key shown in Fig. 14 is cut with a series of undulations 21 on the edges, it being understood, as previously referred to, that undulations in some locks may be desired only on one side of the key, or only for a portion of the length of the shank. Arranged on the carrier 7 is a plate 15, the same being adjustable or movable relative to the carrier 7, as will be hereafter described. Carried by the plate 15 is the key clamping member 24, the plate 15 forming substantially a bed or support for the clamping member. Member 24 is formed with an extending end 25 provided with a further projecting part 26, parts 25 and 26 being adapted to support the key. As is shown, the groove 27 is formed in the same to receive bead 18 on the key. Part 24 is also preferably formed with a slotted opening 29 and a boss or stop 30. Arranged to coöperate with the clamping member 24 is a clamping member 31, which is preferably extended as at 32, and pivotally secured to plate 15 at 33 (see Figs. 1 and 6). The member 31 is formed with a slotted opening 34 in the top. As most clearly shown in Fig. 6, plate 15 carries a threaded stud 35, which projects through the opening 29 in clamping the member 24. Arranged to engage with the stud is a locking member 36, or nut, which is adapted to engage with the plate 24 and lock it in place. The locking member 36 is of a size to extend through the opening or slot 34 in locking member 31, and be engaged by the clamping member 37. I have shown (see Figs. 6 and 12) part 31 formed with a stop 37¹ and a cam surface 37² arranged to respectively stop the clamping lever 37, and maintain the member 31 tightly in place when the lever 37 is in operative position engaging the cam face. Member 31 is shown extended as at 38 with the end extended at 39 so as to overlie the extension 26 of part 24. The same is also formed with a bead 40, arranged to engage in the groove 19 of a key when the bead 18 of the key is engaged in the groove 27 of extension 26. I have shown the bead 40 formed as a separable part having lugs 41, and any suitable means may be employed for securing the same in place when desired. The same may be secured in the extension 26, leaving the groove in the clamping member extension 39. This permits the key to be reversed in the key clamping and a modified series of keys cut, as hereafter set forth The particular form of the clamping mechanism of course depends on the style of key blank.

The keys are cut in the machine illustrated by moving the key between the cutters, and also moving the cutters transversely the key. This is the preferred construction, but, of course, it is immaterial as to whether the key is moved toward the cutters, or the cutters toward the key, or whether the key or cutters are moved transversely the line of movement of the key. I may also say that in addition to reciprocating the key carrier, I also transversely move or raise the key out of cutting position at the end of the cut, so that the same may be retrieved and a new key inserted during the time the carrier is being retrieved and starts on its final travel to cut the key. Also if the key were not moved out of cutting position, the cutting carriage would have to be reversed so as to reverse its travel and follow the edges of the key so as not to vary the cut.

Figure 2:
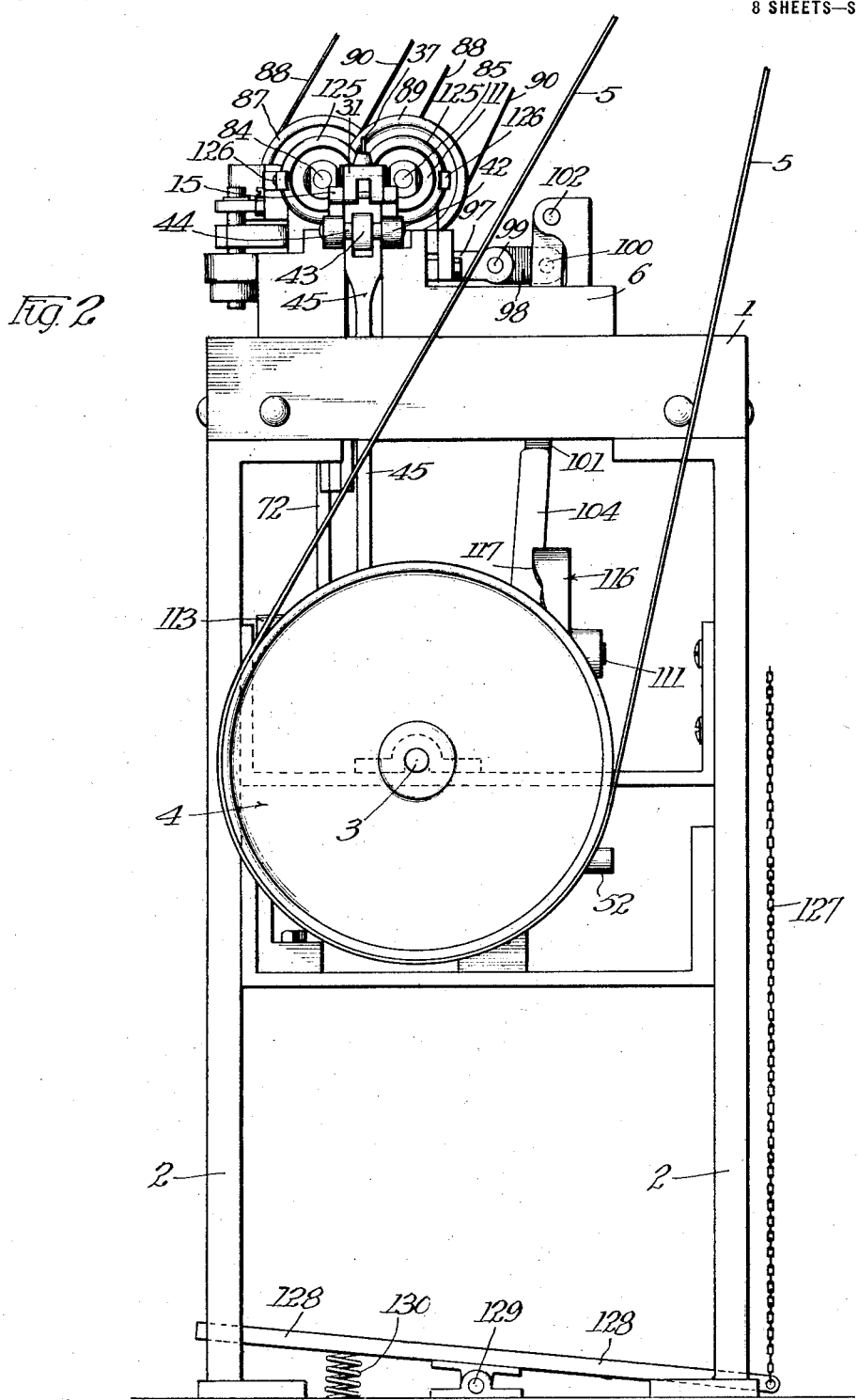
Fig. 2 is a side elevation of the same.

To reciprocate the key carriage 7, which, as most clearly shown in Fig. 4, is dovetailed in the base 6, I provide a lever 45, which is connected to the key carriage by the link 43, pivotally secured at 44 to the carriage, and at 46 to the arm 45. The pin 44 is connected to the key carrier by the brackets or arms 42. Arm 45 (see Fig. 6) is pivotally supported by a pin 47, carried by the brackets 48 on the frame, and is extended downwardly, as shown in Fig. 1, and connected to a link 59 at 60, which is operatively connected with the driving shaft 3.

Referring particularly to Figs. 7, 8 and 10, shaft 3 is also supported by the frame parts 49, and is provided with a worm gear 50. The worm gear 50 meshes with the worm wheel 51 secured to shaft 52, suitably supported from the frame of the machine. Also secured to shaft 52 is a cam 53, arranged to co-act with a lever 56, which is provided with a cam wheel 54, secured in place by a pin 55, or its equivalent. The lever 56 is pivotally supported at 57 by a bracket on the frame parts 49. Secured to lever 56 at 58 is the link 59, which, as before mentioned, is pivotally secured at 60 to the arm 45. As the cam 53 is rotated in the direction of the arrow, the carriage 7 is reciprocated on the bed 6, as will be more fully described hereafter in the operation of the device.

As was previously set forth, plate 15 is adjustable or movable on the carrier 7. As shown in Figs. 4 and 6, the plate 15 is mounted on a vertically movable bar 63, the same being guided and prevented from turning by the guiding pins 64, or equivalent means. I also provide lugs or pins 65, arranged to engage plate 15, when the same is situated on the carrier, so as to make the same more rigid. Rod 63 is connected to a bar 66 by pin 67, or equivalent means, which bar or link 66 is connected by a link 68, pivotally supported at 70 to a link 72, the link 68 being pivotally secured at 69 and 71 respectively to the links 66 and 72. The lower end of link 72 is secured to a cam lever 74 by a pin 73, or equivalent means. The cam lever is supported by a pin 75, and on the end 76 is provided a cam roller 77. This is arranged to co-act with the cam 78, suitably secured to shaft 52. I have also provided a part 79, connected by the bracket 80 to the shaft or cam 78, the part 79 being intended to hold the cam roller 77 in contact with the cam for a portion of its travel. As is obvious, as shaft 52 is rotated through the medium of the cam 78 and the links referred to, the plate 15 is raised and lowered. This is preferably lowered upon the carrier 7 as the key and its carrier move toward the cutters, and raised at the end of the cut, and maintained up until the carrier has moved back sufficiently so that the key will not again be engaged by the cutters.

In the construction shown, as was previously set forth, I have provided two cutters 11 and 12, and means for moving the cutters transversely to the key in a predetermined manner, and in such a way that a key may be duplicated, that is the cutters may be again moved in the identical manner. To do this I have provided a suitably formed cam, or its equivalent, as hereafter referred to, suitably operatively connected with the cutter carriage.

Referring particularly to Figs. 1, 3, 4 and 5, the cutters 11 and 12 are mounted on shafts 84 and 85 respectively. These are carried by suitable bearings 86, mounted on two adjustable carriers 9 and 10. The carriers 9 and 10 are preferably slidably secured to the carriage 8, so that the cutters may be separated or moved closer together, or otherwise varied, as may be desired, to vary the operation of the machine. I have shown the carrier 9 secured to carrier 8 by a pin 93, which is locked in place by a locking pin 94, or equivalent means. Pin 93, through plate 95 and screw 96, or their equivalents, also locks the carrier 10 to the carriage 8. The shafts 84 and 85 are driven by the pulleys 87 and 89, and belts 88 and 90 respectively, it being understood that other equivalent driving means may be employed.

The carriage 8, which is slidably arranged on the base 6, is provided with a bracket 97, through which extends a pin 99, and a link 98 connected to the lever 101 by means of the pin 100. Lever 101 is pivotally secured or pivoted at 102 to the frame of the machine, and extends below the top and connected with an extension 104 (see Figs. 1, 2, 4, 5, 6 and 10). A spring 103 is also employed for drawing the lever 101 into the position shown. The arm or bar 104 is provided with a cam roller 105 (Figs. 1, 7, 8 and 10). Cam roller 105 is arranged or actuated by a suitable cam operatively connected with the driving shaft 3.

In the preferred construction, shaft 3 is provided with a pinion 106, which meshes with a pinion 107, and drives a worm 108 (Figs. 7, 8, 10) arranged to drive a worm wheel 110, which drives a shaft 111. Shaft 111 is mounted in a yoke 112, which is pivotally carried at 114 from the frame brackets 118. The shaft 111 projects through the frame parts 113, and carries a cam member 116, provided with suitable cam faces 117. The purpose of the yoke 112 is to adjustably carry shaft 111 so as to permit the worm wheel 110 to be moved out of engagement with the worm so as to set or reset the cam without having to run the machine until it returns to the desired position, or to dismantle the machine to reset it. I have also shown a lever or arm 120 carried by the frame and provided with an idler 121 and 122, arranged to mesh with the pinions 106 and 107 or their equivalents, so as to vary the operation of the machine by changing the driving, as will be more particularly referred to hereafter. As shown in Figs. 1, 3 and 6, I have provided guards 125, secured in place by the brackets 126, which guards partially cover the cutters and prevent accidents resulting therefrom. I have there shown a chain 127 secured to a foot lever 128, pivotally secured or supported at 129, and maintained in positions shown by a spring 130. This controls the driving of the belt 5 from the line shaft (not shown) and, of course, any equivalent means may be substituted therefor.

The operation of the machine may be briefly described as follows: If it is assumed that the parts are in the positions shown, as for example, in Figs. 1, 3, 6, 7, with a key between the clamping members 24 and 31, the key has been cut and the key carrier is traveling (Figs. 6 and 7) to the right. As soon as the roll 77 drops off of the cam face or cam 78, plate 15 is raised on the carrier 7. The operator is in the meantime turning locking member 37, throwing back clamp 31, removing the cut key, and placing a blank on clamping member 24, as shown in Fig. 9, and turning clamp 31 back and locking the same in position. Cams 53 and 78 are in the meantime continuing to move. The key carriage has reached the limit of its travel, and is started back toward the cutters with a new key clamped between the clamping members. In the meantime, through the mechanism described, cam 116 is operating the cutter-controlling and shifting mechanism for the carriage carrying the cutters, moving the cutters back and forth across the line of travel of the key. As soon as the key reaches the cutters the edges are cut in a series of undulations, or in such other form as may depend upon the cam 116, the cutters, etc., and the relative position of the same in so far as other parts are concerned. As soon as the key has been cut down to the limit of travel of the carrier 7, the cam 78, by means of the intermediate mechanism referred to, raises the plate 15 with the key, and cam 53 causes the carriage to be retrieved as specified, while the cam 116 is continually rotating and the cutter carriage reciprocating as the roller 105 is at a different position on the cam with the starting of each key; consequently each specific key varies from the preceding one, and this continues until the parts have worked to a point where the limit of the machine has been reached, and a key then cut similar to a preceding key, and the operation of varying keys is continued.

By changing the cams 116, different series may be obtained; also by changing the gears or employing the idler gears 121 and 122, and varying them, the operation of the machine may be varied. Of course when the idler gears 121 and 122 or their equivalents are employed, it is necessary to unmesh the gears 106 and 107. This may be provided in any suitable manner, as for example by providing a substitute gear or gears of such size that they do not mesh, so that the gear ratios are changed through the transmission of the power through the idlers. In this case the idlers need not be the same size. Likewise, moving the cutter carriers 9 and 10 closer together, or moving them apart, will vary the cutting effect of the machine. Changing the sizes of the cutters also varies the working of the machine. In the same way if the part 40 is transferred over to clamping member 24, and the key placed in the clamps with the other side up, the cutting of the keys will be varied, even with the same setting of all the other parts. It might be mentioned that the particular key clamps may, of course, be varied for different keys without affecting the results, clamps suitable for the keys illustrated being shown for clearness of description. I have previously referred to the fact that where it is desired to cut only on one side of the key, only one cutter is required. I might also say that while the cutters are shown set to cut parallel, by moving one forward or backward along its axis of rotation, and setting it there, a key might be cut on both edges, but the edges would not be parallel. I might also say that if the key is not fitted in between the cutters along a line parallel with the cutter shafts, but the clamp formed so that the key is slightly at an angle, or a clamp so adjusted, a different key will be cut.

By means of the yoke 112 the cam shaft 111 may be lifted so that the worm wheel 110 is lifted out of mesh with the worm 108. In this case cam 116 may be turned back and set for any desired indication on the indicator, shown in Fig. 1.

Having thus described my invention, it is obvious that various modifications may be made in the same without departing from the spirit of my invention; hence I do not wish to be understood as limiting myself to the exact form, construction, arrangement or combination of parts herein shown and described or uses mentioned except as defined by the appended claims.

What I claim as new and desire to secure by Letters Patent is:—

1. In a device of the kind described and in combination, a suitable reciprocating key carrier provided with means for clamping the key thereon, a pair of rotatable cutters, means for moving said key carrier to bring the key into engagement with the cutters, means for periodically irregularly moving said cutters in the same direction transversely back and forth the line of travel of the key, means for lifting the key out of engagement with the cutters, and thereafter retrieving the carrier.

2. In a device of the kind described and in combination, a suitable frame, a pair of rotatable cutters mounted thereon, said cutters being relatively adjustable, means for periodically moving said cutters back and forth in the same direction transversely to their axes of rotation, a movable key carrier provided with means thereon for clamping a key on the carrier, means for moving said carrier to bring said key into engagement with said cutters, and retrieving the same after a predetermined movement of the carrier, means for transversely moving the key carrier to bring the key out of operative engagement with the cutters before the retrieving of the carrier.

3. In a device of the kind described and in combination, a suitable frame, a pair of rotatable cutters mounted thereon, said cutters being relatively adjustable, means for moving said cutters transversely to their axes of rotation, a movable key carrier provided with means thereon for clamping a key on the carrier, means for moving said carrier to bring said key into engagement with said cutters, and retrieving the same after a predetermined movement of the carrier, said key clamping mechanism adjustably mounted on said carrier, and means for lifting said clamping member and key free from the cutters at the end of the cutting operation and during the retrieving of the carrier.

4. In a key cutting machine of the kind described and in combination, a suitable reciprocating key carrier provided with means for detachably clamping a key thereon, means for moving the key carrier transversely its direction of reciprocation at the end of its travel in one direction and thereafter retrieving the same to its initial position, a pair of opposed rotatable cutters arranged with their axes of rotation parallel with the direction of reciprocation of said key carrier, means for positively moving said key carrier to bring the key into position between the cutters, and means common to said cutters for periodically irregularly moving said cutters in unison in the same direction transversely the line of travel of the key.

5. In a key cutting machine of the kind described and in combination, a suitable frame, a movable key carrier mounted thereon provided with means for clamping a key on the carrier, a cutter carrier, a pair of rotatable cutters mounted on said cutter carrier, said cutters being relatively adjustable, means for moving said cutter carrier, whereby said cutters are moved in unison transversely to their axes of rotation, means for moving said key carrier parallel with the axes of rotation of said cutters to bring the key into cutting engagement with said cutters and retrieving the same after a predetermined cutting of the key and coöperating means for lifting the key carrier to bring the key out of engagement with the cutters before the retrieving of said key carrier and lowering the same during the retrieving of the carrier.

6. In a key cutting machine of the kind described and in combination, a suitable frame, a reciprocating key carrier mounted thereon and provided with means for clamping a key on the carrier, a reciprocating cutter carrier mounted on said frame and movable in a direction transverse to the direction of the reciprocation of said key carrier, a pair of rotatable cutters mounted on said cutter carrier, said cutters being relatively adjustable, means for reciprocating said cutter carrier in a predetermined manner to move said cutters in unison transversely to their direction of rotation, including a rotatable cam, and means for operatively connecting the cam and said carrier, coöperating means for moving said key carrier parallel with the axes of rotation of the cutters, whereby the key is brought into operative position between the cutters, and means for retrieving the same after a predetermined movement of the key carrier, said cutter carrier moving means being arranged to vary the movement of the cutters with each successive movement of the key carrier.

7. In a key cutting machine of the kind described, a suitable frame, a reciprocating cutter carrier mounted on said frame, a reciprocating key carrier mounted on said frame, said key carrier movable in a direction transversely to the movement of said cutter carrier, a pair of relatively adjustable rotatable cutters mounted on said cutter carrier, means for reciprocating said cutter carrier in a predetermined manner, whereby the cutters are moved in unison in an irregular manner transversely to their axes of rotation, including a rotatable cam and means for operatively connecting the cam and cutter carrier, means for driving said cam, means for disconnecting the cam from the driving mechanism as desired, said key carrier provided with means thereon for detachably securing the key on the carrier, means for reciprocating said carrier parallel with the axes of rotation of the cutters, whereby the key is brought into position between the cutters and engaged thereby, and means for lifting the key securing means after a completion of the cutting of the key, whereby the key carrier may be retrieved with the key out of engagement with the cutters.

8. In a key cutting machine, a key-blank holder having relatively fixed and movable parts between which a key blank is adapted to be clamped, said parts being shaped to clamp both sides of a key handle and each having a relatively narrow supporting portion for clamping only the medial portion of the shank of the key leaving exposed the longitudinal edges of the shank which are adapted to provide tumbler surfaces.

9. In a key cutting machine, a holder for a blank having a handle portion and a shank provided with a longitudinal channel, the holder comprising separable parts adapted to clamp the blank therebetween, said parts being shaped to firmly clamp the channel portion of the key blank, leaving exposed the opposite longitudinal edges of the blank which are adapted to be cut to provide tumbler surfaces.

10. In a key cutting machine, the combination of a key-blank holder, key cutting means, and independent cam mechanism for each relatively moving the key-blank holder and cutting means to cut individually different key faces by successive operations each of which automatically produces a different key face.

11. In a key cutting machine, the combination with a key blank holder and key cutting means, of mechanism for relatively moving the key-blank holder and cutting means to cut differently irregular key faces, including continuously rotating cam means permanently associated with the machine to move through successive cam periods during each of which a key having a differently irregular key face is produced.

12. In a key cutting machine, the combination of a key blank holder, key cutting means, means for relatively moving the key-blank holder and cutting means to cut differently irregular key faces, and control mechanism for successively operating said means in a plurality of units of operation during each of which a series of keys each having a predetermined differently irregular key face is cut.

13. In a key cutting machine, the combination with a key-blank holder and key cutting means, of rotatable actuating cams for relatively moving the key-blank holder and cutting means to cut differently irregular key faces and operable through a unit of operation comprising a series of successive periods of operation during each of which periods a key face of individual design is cut, and means for adjusting said actuating means to operate through a plurality of units of operation during each of which a series of keys of predetermined, individually different design is produced.

14. In a key cutting machine, the combination with a key blank holder and key cutting means relatively movable to cut tumbler surfaces on a key blank, a pair of rotatable cams, mechanism actuated thereby operable through successive cam periods, and automatically varied in effect so that an individually different key will be cut during each cam period, and containing indicia representative of said periods, said cam-controlled mechanism being capable of being set by reference to corresponding indicia on the keys to operate through any one period to duplicate a key previously produced during said cam period.

15. In a key-cutting machine, the combination with a key-blank holder and key-cutting means relatively movable to cut an irregular longitudinal face on a key blank, of cam mechanism, a plurality of devices controlled thereby simultaneously operating in timed relation through successive relatively different cam movements to cause said key cutting movement, and means for intermittently operating said cam controlled devices to cut a key at each period of operation, the cam controlled devices by reason of their relatively different cam movement automatically causing a differently irregular face to be cut on each key blank.

16. In a key-cutting machine, the combination with a key-blank holder and key-cutting means, of cam mechanism, means controlled thereby for relatively moving the key-blank holder and cutting means to cut an irregular face longitudinally of the key blank and successively operable in movements during each of which a different key face is cut, a series of these movements constituting a unit of operation, and means for varying the operative effect of said cam controlled means at the end of each unit of operation whereby to cause a new series of individually different keys to be cut.

17. In a key-cutting machine, the combination of a key-blank holder, key-cutting means, a pair of circular cams, means actuated by the cams to relatively move the key-blank holder, and cutting means to cut a key face longitudinally of the blank, means for rotating said cams in timed relation whereby the joint action of the cams for a given period of rotation will produce an irregular key face, the period of rotation for cutting each key consisting of a substantially complete revolution of one of the cams and but a portion of a revolution of the other cam, whereby, due to the times relation of said cams, a different key will be cut at each period of rotation until given starting points on both cams coincide after a series of individually different keys have been cut, and means for adjusting said cam actuated means whereby to change the operative effect of said cams to cut a new series of individually different keys.

18. In a key cutting machine, mechanism for cutting a plurality of individually different key faces of predetermined design, said mechanism operating through successive periods of operation which automatically produce different key faces, the mechanism containing indicia identifying its different periods of operation and adapted to be set according to corresponding indicia on a key to operate through any period of operation to duplicate such key.

19. In a key cutting machine, the combination with a blank holder and key cutting means relatively movable to cut tumbler surfaces on a key blank, of cam-controlled mechanism operable through successive cam periods automatically varied in effect so that an individually different key will be cut during each cam period.

20. In a key-cutting machine, the combination with a key-blank holder and cutting means relatively movable to cut an irregular longitudinal face on the blank, of cam mechanism, mechanism controlled thereby for determining said cutting movement and for automatically cutting in succession a given series of differently irregular key faces, including means for effecting adjustments whereby a plurality of series of keys may be cut, said adjusting means bearing indicia identifying different periods of operation of the cam mechanism, whereby any key may be duplicated by setting the mechanism to operate through the particular period of operation designated by corresponding indicia on the key to be duplicated.

21. In a key-cutting machine, the combination of a key-blank holder, key cutting means, a pair of circular cams, means actuated by the cams for relatively moving the key-blank holder and cutting means to cut an irregular key face, and means for rotating said cam means through a given period for cutting each key, one cam being rotated a complete revolution for each key and the other cam only a partial revolution.

22. In a key-cutting machine of the kind described and in combination a suitable frame, movable key carrying means mounted thereon and provided with means for clamping a key thereon, a cutter carrying means, a pair of rotatable carriers mounted on said cutter carrying means for moving said cutter carrying means whereby said cutters are moved in unison transversely to their axes of rotation, means for moving said key carrying means during the rotation of said carriers to bring the key into cutting engagements with said cutters and retrieving the same after a pre-determined cutting of the key and coöperating means for one of said carrying means for disengaging the key and the cutters before the retrieving of said key carrying means whereby the key is retrieved without cutting.

In testimony whereof, I have hereunto signed my name in the presence of two subscribing witnesses.

EDWARD P. BAIRD.

Witnesses:
   Roy W. Hill,
   Charles I. Cobb.